(12) United States Patent
Komiyama et al.

(10) Patent No.: US 6,447,620 B1
(45) Date of Patent: Sep. 10, 2002

(54) WATER-BASED SURFACE-TREATING AGENT FOR METALLIC MATERIAL

(75) Inventors: Sinobu Komiyama; Yoshihiro Hayashi; Tatsuro Minabe, all of Tokyo; Masashi Masuko, Shizuoka, all of (JP)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/701,619

(22) PCT Filed: May 31, 1999

(86) PCT No.: PCT/JP99/02871

§ 371 (c)(1),
(2), (4) Date: Mar. 2, 2001

(87) PCT Pub. No.: WO99/63012

PCT Pub. Date: Dec. 9, 1999

(30) Foreign Application Priority Data

Jun. 1, 1998 (JP) .......................................... 10-167755

(51) Int. Cl.$^7$ ............................................. C23C 22/00
(52) U.S. Cl. ...................... 148/251; 148/264; 148/267; 252/389.5; 106/14.13
(58) Field of Search .................... 198/251, 264, 198/267; 252/389.5; 106/14.13

(56) References Cited

U.S. PATENT DOCUMENTS

| | | | |
|---|---|---|---|
| 4,170,671 A | 10/1979 | Hirasawa et al. | 427/388 |
| 4,540,733 A | 9/1985 | Ito et al. | 524/407 |
| 4,705,821 A | 11/1987 | Ito et al. | 524/407 |
| 4,966,634 A | 10/1990 | Saeki et al. | 148/251 |
| 5,324,862 A | 6/1994 | Yokota et al. | 568/608 |
| 5,378,291 A | 1/1995 | Ara et al. | 148/251 |

FOREIGN PATENT DOCUMENTS

| | | |
|---|---|---|
| EP | 0046268 | 2/1982 |
| EP | 0322984 | 7/1989 |
| GB | 1077226 | 7/1967 |
| GB | 1481826 | 8/1977 |
| GB | 2241501 | 9/1991 |

OTHER PUBLICATIONS

JP 44[1969]5,285(JP69005285)—Jan. 1968—Questel Orbit Accession No. 1968–87902P[00], Derwent Manual code: CPI: A04–F04 A12–B04 A12–E; Derwent Class: A00 (corresp. to GB 1,077,226).
JP 49[1974]31,026(JP74031026)—Aug. 17, 1974—Questel Orbit Accession No. 1974–65578V[37]; Derwent Manual code: CPI: A08–R A12–B04 G02–A05 M13–H05; Derwent Classes: A18 A32 A82 G02 M14 P78.
JP 49[1974]40,865(JP74040865)—Nov. 6, 1974—Questel Orbit Accession No. 1974–83710V[48]; Derwent Manual code: CPI: A04–B03 A04–B05 A04–C04A A04–D04 A04–F01 A12–B04A M13–H05; Derwent Classes: A13 A82 M13.

JP 50[1975]57,931(JP50057931)(BE–820025)—May 20, 1975—Questel Orbit Accession No. 1975–12756W[08]; Derwent Manual code: CPI: A05–E08 A12–B04A G02–A05 M13–H05 M14–D; Derwent Classes: A14 A23 A82 G02 M14 P42 (corresp. to GB 1 481 826).
JP 7[1995]6,070(JP95006070)(WO8800622)—Jan. 25, 1995—Questal Orbit Accession No. 1988–036451[05]; Sec. Acc. No. CPI: C1988–016250; Derwent Manual code: CPI: A04–F01A1 A05–H03 A05–H04 A08–S05 A12–B04D E35–P G02–A02C G02–A05E M14–D03 (corresp. to US 4,966,634).
JP 6[1994]59,717(JP04272844)—Aug. 10, 1994—Questel Orbit Accession No. 1992–370535[45]; Sec. Acc. No. CPI: C1992–164755; Sec. Acc. No. non–CPI: N1992–282457; Derwent Manual code: CPI: A05–F01E1 A07–B03 A12–B04D G02–A05E M13–H05; Derwent Classes: A18 A82 G02 M13 P42 P73.
JP 5[1993]279,867—Oct. 26, 1993—Questel Orbit Accession No. 1993–374973[47]; Sec. Acc. No. CPI: C1993–166637; Derwent Manual code: CPI: A05–H01B A06–A00E A12–W12E M14–D03; Derwent Classes: A97 M14.
JP 6[1994]192,850—Jul. 12, 1994—Questel Orbit Accession No. 1994–260945[32]; Sec. Acc. No. CPI: C1994–119560; Derwent Manual code: CPI: A05–G01E1 A12–B04C A12–S09 G02–A05E M14–D03; Derwent Classes: A82 G02 M14.
JP 4[1992]50,204(EP–472837)—Feb. 19, 1992—Questel Orbit Accession No. 1992–073421[10]; Sec. Acc. No. CPI: C1992–033678; Derwent Manual code: CPI: A04–C A08–S05 E10–E04F G02–A03 G02–A04A G02–A05 G03–B02C; Derwent Classes: A60 E14 G02 G03 (corresp. to US 5,324,862).

(List continued on next page.)

*Primary Examiner*—John Sheehan
*Assistant Examiner*—Andrew L. Ottmans
(74) *Attorney, Agent, or Firm*—Stephen D. Harper

(57) ABSTRACT

A water-based surface-treating agent for metallic materials which gives a film highly satisfactory in corrosion resistance, blackening resistance, wet secondary adhesion to topcoatings, low-pollution characteristics (amount of fixed chromium), chemical resistance (especially acid resistance and alkali resistance), etc., while retaining the intact practical liquid stability of conventional chromate-containing resinous coating agents. The water-based surface-treating agent comprises a synthetic resin emulsion and hexavalent chromium ions and has a pH of 5 or lower, the synthetic resin emulsion being one obtained by emulsion-polymerizing the following ingredients using a nonionic polymerizable emulsifier and a nonionic nonpolymerizable emulsifier: (1) an ethylenic carboxylic acid, (2) a functional acrylic monomer having at least one of N-((un)substituted methylol)carbamoyl, phosphonate, alkoxy, cyano, and carbamoyl groups, and (3) a third monomer which is different from the ingredients (1) and (2) and forms the skeleton of the copolymer to be obtained.

20 Claims, No Drawings

OTHER PUBLICATIONS

JP 62[1987]104,802—May 15, 1987—Questel Orbit Accession No. 1987–173826[25]; Related Acc. No.: 1995–261294 1995–261295; Sec. Acc. No. CPI: C1987–072406; Derwent Manual code: CPI: A08–S05 A10–E01 A10–E08A E05–G09D E10–A09B8 E10–E04M2 N01–A01 N01–C N01–D N03–F N03–G N05–B N05–D; Derwent Classes: A25 A41 E19.

JP 50[1975]98,484—Aug. 5, 1975—Questel Orbit Accession No.: 1977–31480Y[18]; Derwent Manual code: CPI: A08–S05 A08–S06 A10–B05 E10–C04D E10–E04G E10–E04K E10–G02G; Derwent Classes: A60 E19.

JP 53[1978]126,093(JP54093088)—Oct. 16, 1978— esp@cenet database—12—IPC Classification : C08F10/00; C08F4/60.

JP 56[1981]28,208—Mar. 19, 1981—Questel Orbit Accession No. 1981–33341D[19]; Derwent Manual code: CPI: A02–A03 A04–C04A A04–F06A A07–B02 A07–B03 A12–V03C B04–C03C B12–K04; Derwent Classes: A13 A25 A96 B04.

JP 3–219086—Sep. 26, 1991—Questel Orbit Accession No. 1991–328725[45]; Sec. Acc. No. CPI: C1995–019827; Derwent Manual codes: CPI: A04–A A04–D04A1 A04–F01A1 A07–B02 A08–M03 A08–S05 A12–B04D G02–A05 G02–A05E M13–H05 M13–K M14–D03; Derwent Classes: A14 A82 G02 M13 (corresp. to US 5,378,291).

JP 10–88036—Apr. 7, 1998—Questel Orbit Accession No: 1998–267325[24]; Sec. Acc. No. CPI: C1998–083450; Derwent Manual code: CPI: A08–R06B A12–B04 G02–A05E M13–H04 M13–H05 M14–D03 M14–K; Derwent Classes A32 G02 M13 M14.

JP 4–272844—Sep. 29, 1992—Questel Orbit Accession No. 1992–370535[45]; Sec. Acc. No. CPI: C1992–164755; Sec. Acc. No. non–CPI: N1992–282457; Derwent Manual code: CPI: A05–F01E1 A07–B03 A12–B04D G02–A05E M13–H05; Derwent Classes: A18 A82 G02 M13 P42 P73.

JP 11–100677—Apr. 13, 1999—Questel Orbit Accession No. 1999–296750[25]; Sec. Acc. No. CPI: C1999–087508; Derwent Manual code: CPI: A04–A A07–B A12–B04F G02–A05E M14–D03; Derwent Classes: A14 A82 G02 M14.

JP 51–15060(JP76015060)—May 14, 1976—Questel Orbit Accession No. 1976–45104X[24]; Derwent Manual code: CPI: A04–F04B A04–F06E1 A08–M A10–E15 A11–B05A A12–B01A G02–A02C M11–G; Derwent Classes: A14 A82 G02 M11.

JP 1–172472(EP–322984)—Jul. 7, 1989—Questel Orbit Accession No. 1989–194322[27]; Sec. Acc. No. CPI: C1989–085897; Derwent Manual code: CPI: A04–D04A1 A04–F01A1 A04–F04B A07–B A12–B04 A12–B04D G02–A05E M14–D03; Derwent Classes: A14 A82 G02 M14 (corresp. to EP 322 984).

JP 58–213064(FR2527624—Dec. 10, 1983—Questel Orbit Accession No. 1984–007216[02]; Sec. Acc. No. CPI: C1984–002912; Sec. Acc. No. non–CPI: N1984–005313; Derwent Manual code: CPI: A04–A A04–D04A A04–F04B A04–F06E1 A07–B02 A08–M01B A12–B04D G02–A05E M13–H05 M14–K; Derwent Classes: A14 A82 G02 M14 P42 (corresp. to US 4,705,821).

JP 54–11146—Jan. 27, 1979—Questel Orbit Accession No. 1979–18706B[10]; Derwent Manual code: CPI: A04–A A04–D04A A04–F04B A04–F06E1 A12–B01 A12–B04B G02–A02C G02–A05E; Derwent Classes: A32 A82 G02 P42.

JP 54–11145—Jan. 27, 1979—Questel Orbit Accession No. 1979–18705B[10]; Derwent Manual code: CPI: A04–F04B A04–F06E1 A10–B03 A12–B01E G02–A02C G02–A02D G02–A05E; Derwent Classes: A32 A82 G02 P42.

JP 53–132439—Nov. 18, 1978—Questel Orbit Accession No. 1979–00787B[01]; Derwent Manual code: CPI: A04–D04A A04–F04A A07–B02 A08–S06 A12–B04 M14–K; Derwent Classes: A14 A97 M14 P42.

JP 53–49029(BE–854260)—May 4, 1978—Questel Orbit Accession No. 1977–79365Y[45]; Derwent Manual code: CPI: A12–B04 G02–A05E M13–H05 M14–K; Derwent Classes: A14 A82 G02 M14 P42 (corresp. to US 4,170,671).

JP 3–254866(GB2241501)—Nov. 13, 1991—Questel Orbit Accession No. 1991–262011[36]; Sec. Acc. No. CPI: C1991–113695; Derwent Manual code: CPI: A08–R01 A12–B01A A12–T05 G02–A05; Derwent Classes: A14 A82 A95 G02 (corresp. to GB 2 241 501).

JP 59–197575(FR2544733)—Nov. 9, 1984—Questel Orbit Accession No. 1984–302398[49]; Sec. Acc. No. CPI: C1984–128704; Derwent Manual code: CPI: A08–S06 A12–B04B G02–A05E M14–F01 M14–F02; Derwent Classes: A82 G02 M14 (corresp. to US 4,540,733).

JP 58–174582—Oct. 13, 1983—Questel Orbit Accession No. 1983–823412[47]; Sec. Acc. No. CPI: C1983–113816; Sec. Acc. No. non–CPI: N1983–209079; Derwent Manual code: CPI: A04–F01 A05–B02 A05–E04E A08–D04 A12–B04C A12–B04D M13–H; Derwent Classes: A32 M14 P42.

JP 57–59965(EP—46268)—Apr. 10, 1982—Questel Orbit Accession No. 1982–16051E[09]; Derwent Manual code: CPI: A11–B05D A12–B04B G02–A02 G02–A02C G02–A02D M13–H05 M14–D M14–K; Derwent Classes: A82 G02 M13 P42 (corresp. to EP 0 046 268).

WATER-BASED SURFACE-TREATING AGENT FOR METALLIC MATERIAL

FIELD OF THE INVENTION

The present invention pertains to a water-based surface-treating agent for metallic materials. In more detail, the present invention pertains to a water-based surface-treating agent for metallic materials for use in rustproofing metallic materials that require surface protection, such as iron, steel, zinc, aluminum, magnesium, stainless steel, tin, and titanium, and particularly plated steel materials prepared by plating the surface of steel materials, which are one of the most important industrial materials, with zinc, zinc-based alloys, aluminum-zinc alloys, aluminum, etc.

BACKGROUND TECHNIQUES

Metallic materials, particularly steel materials which are typical of these materials, still maintain a firm premier position among industrial materials owing to their excellent physical properties and economic advantages. Noteworthy and ceaseless effort is being made to control corrosive wear, which is the weakest feature of steel materials. Typical materials of this kind include plated steel materials prepared by plating the surface of steel materials with zinc, zinc-based alloys, aluminum-zinc alloys, aluminum, etc. Coating metals such as zinc, zinc-based alloys, aluminum-zinc alloys, and aluminum applied on the surface of steel materials usually become less noble in potential than the base steel materials and exhibit sacrificial protection. They also prevent wear of the coating layer itself by forming a barrier compound layer on the surface, thus enabling the protection of the base steel materials over long periods of time.

The zinc, zinc-based alloys, aluminum-zinc alloys, and aluminum coating layers, which are oxidized in actual use environments, form barrier compound layers that consist of oxides, hydroxides, carbonates, chlorides, etc., of these metals on the surface, and thereby protect the coating metal layers, but the barrier effect is not perfect; thus the coating layers gradually wear and the base materials begin to corrode at the points where the coating layers have disappeared. The barrier compound layers have white rust exhibiting a white color or black rust exhibiting a gray-to-black color and are not preferred from the standpoint of appearance; when such rust forms in the distribution process before the plated steel materials made ready for use, there will inevitably be complaints regarding appearance. To deal with this, plated steel materials of this kind are usually subjected to a chromate treatment comprised mainly of a chromate before being shipped.

Of these plated steel products, sheet and strip products are produced in the largest volumes. Plated steel strip is produced by plating a strip-like steel product on a continuous plating line. Sheet products are typically made by plating the steel when it is in strip form, then cutting it on a slitter line. The productivity of a continuous plating line is extremely high, e.g., the line speed is generally 100–200 meters/min. The chromate treatment for plated steel strip is usually performed in a continuous plating line, this step being accomplished between the plating step and a steel strip winding device.

Because a continuous plating line is operated at high speed, a reactive chromate treatment that requires a reaction time and a post-washing process is undesirable because the treatment zone would have to be long. Therefore, a non-reactive coating-type chromate treatment is generally employed. The treatment method involves bringing an aqueous composition that contains chromic acid into contact with the surface of plated steel sheet by spraying or dipping, then removing the excess liquid by roll wiping or gas wiping; or applying a fixed amount of said aqueous composition by a roll coater and then immediately drying by heated air, infrared rays, far infrared rays, or possibly by a method such as induction heating.

For some time after the first continuous plating line was constructed in Japan, treatment with a simple chromic anhydride aqueous solution was carried out as the chromate treatment. In the early days when plated steel sheet was first commercialized, only short-term rust prevention (white rust control) was required, but in recent years a wide variety of requirements, such as much higher corrosion resistance, blackening resistance, workability, fingerprint resistance, adhesion to topcoats, low pollution characteristics (proportion of fixed chromium), and chemical resistance of the coating, have developed and need to be satisfied.

Various surface treatment methods are known for providing higher added value by treatments using synthetic resin-containing chromate treatment solutions to satisfy the above-mentioned requirements. For example, a large number of related techniques are disclosed in Japanese Kokoku No. 44[1969]-5,285, Japanese Kokoku No. 44[1969]-8,337, Japanese Kokoku No. 49[1974]-31,026, Japanese Kokoku No. 49[1974]-40,865, Japanese Kokai No. 50[1975]-57,931, Japanese Kokoku No. 7[1995]-6,070, Japanese Kokoku No. 6[1994]-59,717, Japanese Kokai No. 5[1993]-279,867, and Japanese Kokai No. 6[1994]-192,850. These prior art techniques use water-soluble synthetic resins or synthetic resin dispersions and chromic acid compounds as the main ingredients, and coatings that are formed on the surface of metallic materials by chromate treatments containing these synthetic resins, are superior to conventional inorganic chromate coatings in performance properties such as corrosion resistance, adhesion to topcoats, fingerprint resistance, proportion of fixed chromium, lubricity, workability, and appearance. These prior art techniques can be roughly classified as follows according to use.

If about 0.01–2-fold of a synthetic resin material, relative to a conventional inorganic chromate coating, is added to a chromate treatment solution, various performance properties such as corrosion resistance, fingerprint resistance, proportion of fixed chromium, lubricity, and workability can usually be upgraded to the next higher level. Furthermore, if a water-soluble polymer containing large amounts of acrylic acid, maleic acid, etc., with polar groups in the polymer structure is added, especially adhesion to topcoats can usually be improved. Resin-containing chromate treatments in which relatively small amounts of resin materials are incorporated in the inorganic chromate coating, as mentioned above, are considered to be a high-function grade of conventional inorganic chromate treatment.

On the other hand, a synthetic resin-containing chromate treatment coating in which about 2–300-fold of a synthetic resin material is incorporated, based on the chromate coating, is usually formed by applying a mixed solution of a synthetic resin dispersion and an aqueous chromium compound solution on the surface of a substrate metal, followed by drying. A treatment of this kind can sharply improve especially workability, corrosion resistance including worked areas, lubricity, and proportion of fixed chromium, and is considered to be a high-grade treatment that differs a great deal from a conventional inorganic chromate treatment. Treatment agents of this type are differentiated as chromate-containing resinous coating agents, because they generally contain resin materials in very large ratios relative to the chromium compound, and the recent market demand for these agents has greatly increased.

However, when the aforesaid chromate-containing resin coatings are used on an industrial scale, the dispersion stability of the system may in some cases be impaired, as the emulsifier component in the synthetic resin dispersion can be decomposed by oxidation because the chromate ion is a strongly oxidizing material. In fact, there are cases where stable operation has become impossible, because of gelling of the treatment solution, the tendency for sharp increases in viscosity to occur during the coating process with a roll coater, etc. These phenomena tend to occur more frequently when the chromate ion is incorporated in large amounts relative to the synthetic resin dispersion, or when the pH of the system is adjusted to the acidic side with a view to increasing the proportion of fixed chromium by reducing excess hexavalent chromium ions during film formation in order to incorporate trivalent chromium ions and multivalent metal ions, or with a view to achieving metal crosslinking with chromic acid reduction products. To deal with these problems, the stability of an industrial operation can be improved by adding specified nonionic surfactants as emulsifier components of the synthetic resin dispersions in the aforementioned Japanese Kokoku No. 7[1995]-6,070, Japanese Kokai No. 5[1993]-279,867, and Japanese Kokai No. 6[1994]-192,850. Furthermore, in the technique to ensure practical stability that is disclosed in Japanese Kokoku No. 6[1994]-59,717, anionic and/or nonionic reactive emulsifiers with radical polymerization ability are incorporated, the pH is adjusted to 6–8, and the amount of hexavalent chromium relative to 100 parts by weight of resin solids is adjusted to 0.1–2 parts by weight.

DISCLOSURE OF THE INVENTION

However, in coatings that can be obtained by applying and drying chromate-containing resinous coating agents in which the dispersion stability has been improved with the use of the nonionic surfactants described in the aforementioned prior art, the surfactant components segregate without sufficiently dissolving in the resin coatings because of their relatively high hydrophilicity; thus, if these surfactants exist in large quantities, the continuity of the resin coatings will be greatly impaired, and various properties related to water resistance will decline. In the prior art directed at achieving dispersion stability by carrying out emulsion polymerization with the use of anionic and/or nonionic reactive emulsifiers with radical polymerization ability, on the other hand, the chemicals approach has low flexibility because it is restricted by the limited pH range and the limited hexavalent chromium content, and this in turn makes it very difficult to respond to the ongoing market demand for upgrading performance and functionality.

The object of the present invention is to provide a chromate-containing resinous coating agent as an aqueous surface-treating agent for metallic materials, which can sharply upgrade various properties related to the water resistance of a finished coating, i.e., that can satisfy a wide variety of requirements that involve corrosion resistance, blackening resistance, wet secondary adhesion to topcoats, low-pollution characteristics (proportion of fixed chromium), and resistance to chemicals (especially acid resistance and alkali resistance), even though it contains a necessary and sufficient amounts of hexavalent chromium ions (chromate ions) with respect to a synthetic resin dispersion, and if necessary trivalent chromium ions as well in order to replace some of the hexavalent chromium ions, multivalent metal ions, inorganic acids, lubricating components, etc., while keeping its practical stability intact even when the pH is adjusted to the acidic side of 5 or lower.

The present inventors carried out extensive studies to attain the above-mentioned objective, and found that said objective can be attained by using, in combination, a reactive emulsifier with radical polymerization ability which is nonionic and contains at least one reactive carbon-carbon double bond per molecule, and a nonionic emulsifier with no radical polymerization property, as the emulsifiers to produce an emulsion, with specified monomer compositions. It was this discovery that led to the development of the present invention.

Namely, the present invention is a water-based surface-treating agent for metallic materials, characterized in that it contains the following synthetic resin emulsion and hexavalent chromium ions, and has a pH of ≦5. The synthetic resin emulsion for use in the present invention is a synthetic resin emulsion obtained by emulsion-polymerizing the following ingredients, using a reactive emulsifier with radical polymerization ability which is nonionic and contains at least one reactive carbon-carbon double bond per molecule, and a nonionic emulsifier with no radical polymerization property: (1) a first monomer component consisting of one or more ethenic unsaturated carboxylic acids; (2) a second monomer component based on a functional acrylic monomer with at least one of N-(unsubstituted or metholy-substituted) carbamoyl, phosphonate, alkoxy, cyano, and carbamoyl groups; and (3) a third monomer component that is not included in (1) and (2), is copolymerizable with (1) and (2), and forms the skeleton of the copolymer to be obtained.

A water-based surface-treating agent for metallic materials of the present invention is not exclusively a one-solution-type composition as mentioned above, which consists of the aforesaid synthetic resin emulsion and hexavalent chromium-containing aqueous solution, but also can be a two-solution-type water-based surface-treating agent for metallic materials which will give the aforesaid water-based surface-treating agent for metallic materials when the above-mentioned two are mixed. This two-solution type can be a more suitable form for practical use than the one-solution type.

It is desirable for the weight ratio of the above-mentioned nonionic, reactive emulsifier with radical polymerization ability that contains at least one reactive carbon-carbon double bond per molecule to the nonionic emulsifier with no radical polymerization property to be 10:1–50. The proportions of the aforesaid first to third monomers are preferably 0.5–10 weight % for the first monomer, 0.5–60 weight % for the second monomer, and 30–99 weight % for the third monomer, based on the total of the three monomers, from the various points of view mentioned later. Preferred as the aforesaid third monomer component is at least one selected from among (meth)acrylic acid esters not included in (2), styrene, methylstyrene, vinyl acetate, vinyl esters of saturated carboxylic acids branched at the α-position, vinyl chloride, vinyl toluene, and ethylene.

The water-based surface-treating agent for metallic materials of the present invention (hexavalent chromium ion-containing aqueous solution in the case of the two-solution type) preferably contains trivalent chromium ions additionally so as to replace some of the hexavalent chromium ions, and preferably has weight ratios of trivalent chromium ions/(hexavalent chromium ions+trivalent chromium ions) of 0.1–0.9, in order to increase the proportion of fixed chromium by increasing the insolubility in water of the chromate coating to be formed on the surface of a metallic material. Furthermore, the water-based surface-treating agent for metallic materials of the present invention (hexavalent chromium ion-containing aqueous solution in the case of the two-solution type) increases the weight ratio of trivalent chromium ion/(hexavalent chromium ion+ trivalent chromium ion), and can also prevent coloring due to trivalent chromium compounds, if phosphate ions are additionally incorporated so as to adjust the weight ratio of phosphate ion $(PO_4^{3-})$/(hexavalent chromium ion+trivalent chromium ion) to 0.05–5.0 in the case of incorporating trivalent chromium ions.

BEST MODE FOR CARRYING OUT THE INVENTION

The water-based surface-treating agent for metallic materials of the present invention is applied as a one-solution type, i.e., as a composition, when it is applied to a metallic material, but through the periods of production, distribution, and storage it is more practical to provide it as a two-solution type, i.e., as a two-solution-type surface-treating agent consisting of the aforesaid synthetic resin emulsion and a hexavalent chromium-containing aqueous solution, considering that oxidation and reduction reactions progress, though only a little, after the two solutions are mixed into one. According to the invention, the two-solution-type surface treating agent is made into a one-solution type water-based surface-treating agent for metallic materials by mixing the two solutions in a ratio specified by the user or in an appropriate ratio at the time of use.

In a water-based surface-treating agent for metallic materials of the present invention, a synthetic resin emulsion consisting of a certain specified monomer composition, produced by emulsion polymerization with the use of a combination of a nonionic, reactive emulsifier with radical polymerization ability and a nonionic emulsifier with no radical polymerization property, is used basically as the synthetic resin emulsion that is used in conventional chromate-containing resinous coating agents.

The synthetic resin emulsion to be used in the water-based surface-treatment agent for metallic materials of the present invention is one that produces a tremendous effect, as a major component of a chromate-containing resinous coating agent, with regard to improving performance characteristics such as high corrosion resistance due to the barrier effect of the resin film, fingerprint resistance, proportion of fixed chromium, lubricity, workability, and appearance, and it can be obtained by emulsion-polymerizing monomers of the following groups (1), (2), and (3):

(1) First monomer component consisting of one or more ethenic unsaturated carboxylic acid monomers;

(2) Second monomer component based on a functional acrylic monomer with at least one of N-(unsubstituted or metholy-substituted)carbamoyl, phosphonate, alkoxy, cyano, and carbamoyl groups; and (3) Third monomer component that is not included in (1) and (2), is copolymerizable with (1) and (2), and forms the skeleton of the copolymer to be obtained.

The monomers of each group will now be described.

The ethenic unsaturated carboxylic acid monomers of (1) refer to unsaturated mono- or dicarboxylic acid monomers. The ethenic unsaturated carboxylic acid monomers are the sources of carboxyl groups that contribute mainly to adhesion to metals. The ethenic unsaturated carboxylic acid monomers include acrylic acid, methacrylic acid, crotonic acid, itaconic acid, maleic acid, fumaric acid, etc., and their half esters.

Functional acrylic monomers with at least one of N-(unsubstituted or metholy-substituted)carbamoyl, phosphonate, alkoxy, cyano, and carbamoyl groups of (2) include (meth)acrylamides that contain an N-unsubstituted or substituted (particularly lower alkoxy C=1–4, and especially 1 or 2)-substituted) methylol group, such as N-methylolacrylamide, N-methylolmethacrylamide, N-butoxymethylacrylamide, and N-butoxymethylmethacrylamide; phosphonyloxy lower alkyl (C=1–4, and especially 1 or 2) (meth)acrylates such as phosphonyloxymethyl acrylate, phosphonyloxyethyl acrylate, phosphonyloxypropyl acrylate, phosphonyloxymethyl methacrylate, phosphonyloxyethyl methacrylate, and phosphonyloxypropyl methacrylate; lower alkoxy (C=1–4, and especially 1 or 2) lower alkyl (C=1–4, and especially 1 or 2) (meth)acrylates such as methoxymethyl acrylate, methoxyethyl acrylate, ethoxymethyl acrylate, ethoxyethyl acrylate, methoxymethyl methacrylate, methoxyethyl methacrylate, ethoxymethyl methacrylate, and ethoxyethyl methacrylate; acrylonitrile; acrylamide; and methacrylamide.

The aforesaid monomers of (2) with the N-(unsubstituted or metholy-substituted)carbamoyl, phosphonate, alkoxy, cyano or carbamoyl group(s) contained by the respective monomers, contribute to improving the adhesion between the metal surface treatment coating to be formed by the composition of the present invention and a coating applied on top of said coating.

The third monomer of (3) that is not included in (1) and (2), is copolymerizable with (1) and (2), and forms the skeleton of the copolymer to be obtained, should be a monomer that contains an ethenic unsaturated bond usable in general emulsion polymerization; then it can be used with no special restrictions other than the above-mentioned ones. Furthermore, the monomer of (3) forms the skeleton of the synthetic resin emulsion to be used in the present invention, and is a fundamental monomer that dictates physical properties such as hardness, flexibility, strength and elongation, elasticity, stickiness, glass transition temperature, minimum film-forming temperature of the resin, and chemical stability; thus, it preferably includes one or more selected from among acrylic monomers consisting of one or more (meth) acrylic acid esters not included in (2), examples including esters of (meth)acrylic acid with alkanols with 1–8 carbon atoms, such as methyl acrylate, methyl methacrylate, ethyl acrylate, ethyl methacrylate, isopropyl methacrylate, n-butyl acrylate, n-butyl methacrylate, 2-ethylhexyl acrylate, 2-ethylhexyl methacrylate, and octyl methacrylate; and styrene, methylstyrene, vinyl acetate, vinyl esters of saturated carboxylic acids branched at the α-position, vinyl chloride, vinyl toluene, and ethylene. Of these, (meth)acrylic acid esters provide a coating with excellent weather resistance and make it easier to set the glass transition temperature. Styrene is preferred because of excellent water resistance and alkali resistance.

Furthermore, the alkoxy alkyl(meth)acrylates indicated in (2) are specific monomers that have the effect of improving adhesion as functional monomers of (2) and also function as the skeletal monomers indicated in (3). Accordingly, combinations such as acrylic acid-alkoxyalkyl(meth)acrylate-styrene are possible, and the copolymers obtained provide a sufficient effect as the synthetic resin emulsion to be used in the present invention.

Suitable proportions of monomers (1), (2), and (3) to use are 0.5–10 weight % for (1), 0.5–60 weight % for (2), and 30–99 weight % for (3), based on the total weight of (1), (2), and (3). If the amount of monomer (1) is less than 0.5 weight %, the polymerization stability (extent to which agglomeration and gelling do not occur upon polymerization) may not be satisfactory; with more than 10 weight %, the stability of the miscibility between the synthetic resin emulsion to be obtained and the chromic acid or chromate used to provide hexavalent chromium ions may not be satisfactory. The amount of (1) is preferably 1–5 weight %. If the amount of (2) is less than 0.5 weight %, topcoat adhesion may not be satisfactory; with more than 60 weight %, the polymerization stability, storage stability of the emulsion, stability of the miscibility with chromic acid or chromate, and storage stability of the composition may not be satisfactory. The amount of (2) is preferably 1–50 weight %. If the amount of (3) is less than 30 weight %, the content of component (2) becomes excessive, and the polymerization stability, storage stability of the emulsion, stability of the miscibility with chromic acid or chromate, and storage stability of the composition may not be satisfactory; with more than 99 weight %, the contents of components (1) and (2) become too low, and polymerization stability and topcoat adhesion may not be satisfactory. The amount of (3) is preferably 45 weight % or more, and particularly 45–98 weight % in relation to the preferred amounts of (1) and (2).

The emulsifier to be used upon polymerization of the synthetic resin emulsion to be used in the present invention is a combination of a nonionic, reactive emulsifier with radical polymerization ability that contains at least one reactive carbonarbon double bond per molecule and a nonionic emulsifier with no radical polymerization property.

For the nonionic, reactive emulsifiers with radical polymerization ability, a wide range of conventionally known compounds can be used, examples including those with the following structural formulas:

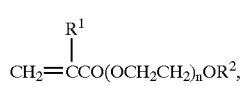
(1)

$$CH_2=\overset{R^1}{\underset{|}{C}}CO(OCH_2CH_2)_nOR^2,$$

in which $R^1$ represents hydrogen or methyl; $R^2$ represents hydrogen, alkyl, or phenyl; and n represents a number from 4–30 (refer to Japanese Kokai No. 53[1978]-126,093);

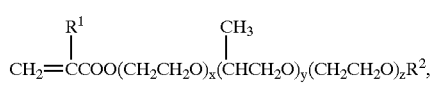
(2)

$$CH_2=\overset{R^1}{\underset{|}{C}}COO(CH_2CH_2O)_x(\overset{CH_3}{\underset{|}{C}}HCH_2O)_y(CH_2CH_2O)_zR^2,$$

in which each of $R^1$ and $R^2$ represents hydrogen or methyl; x represents a number from 0 to 100; y represents a number from 0 to 100; z represents a number from 0 to 100; and $1 \leq (x+y+z) \leq 100$ (refer to Japanese Kokai No. 56[1981]-28,208);

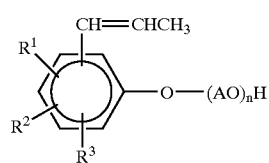
(3)

in which $R^1$ represents an alkyl group, etc., of $C_6$–$C_{18}$; $R^2$ represent H or an alkyl group, etc., of $C_6$–$C_{18}$; $R^3$ represents H or a propenyl group; A represents an alkylene group of $C_2$–$C_4$; and n represents a number from 1–200 (refer to Japanese Kokai No. 4[1992]-50,204);

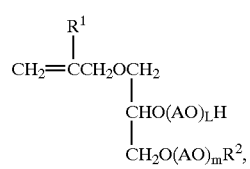
(4)

$$CH_2=\overset{R^1}{\underset{|}{C}}CH_2OCH_2\\ \underset{|}{CHO(AO)_LH}\\ \underset{|}{CH_2O(AO)_mR^2},$$

in which $R^1$ represents H or $CH_3$; $R^2$ represents a hydrocarbon group of $C_8$–$C_{24}$ or an acyl group; A represents an alkylene group of $C_2$–$C_4$; L represents a number from 0–100, and m represents a number from 0–50 (refer to Japanese Kokai No. 62[1987]-104,802);

(5)

$$CH_2=\overset{}{\underset{|}{C}}COO(A^1O)_mR^1\\ (CH_2)_LCOO(A^2O)_nR^2,$$

in which each of $R^1$ and $R^2$ independently represents H, a hydrocarbon group of $C_1$–$C_{36}$, or an acyl group; each of $A^1$ and $A^2$ represents an alkylene group of $C_2$–$C_4$; L represents 1 or 2; each of m and n represents 0 or a positive number; $m+n \geq 3$; and, when both $R^1$ and $R^2$ are H, each of m and $n \geq 1$ (refer to Japanese Kokai No. 50[1975]-98,484).

In the above-mentioned formula (1), m can vary, but is usually 8–12, and particularly 8or 9.

The reactive emulsifiers of formula (2) include acrylic acid or methacrylic acid esters of polyethylene oxide, acrylic acid or methacrylic acid esters of polypropylene oxide, and acrylic acid or methacrylic acid esters of block copolymers of ethylene oxide with propylene oxide. Specific, suitable compounds can be given as follows:

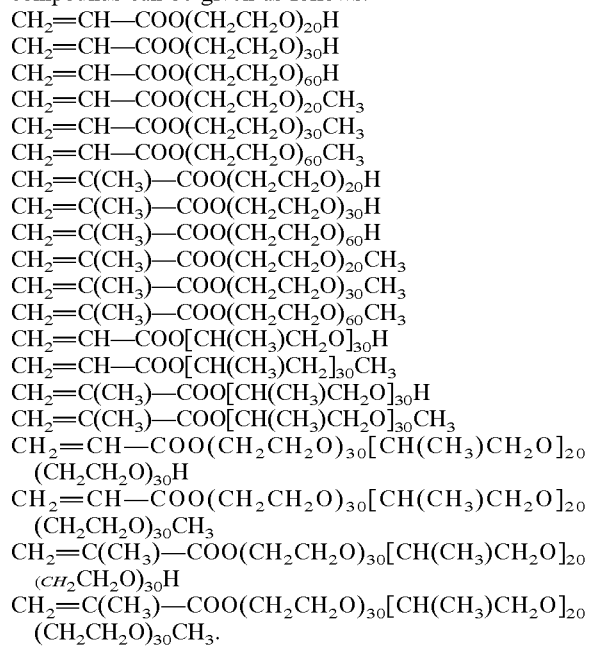

$CH_2=CH-COO(CH_2CH_2O)_{20}H$
$CH_2=CH-COO(CH_2CH_2O)_{30}H$
$CH_2=CH-COO(CH_2CH_2O)_{60}H$
$CH_2=CH-COO(CH_2CH_2O)_{20}CH_3$
$CH_2=CH-COO(CH_2CH_2O)_{30}CH_3$
$CH_2=CH-COO(CH_2CH_2O)_{60}CH_3$
$CH_2=C(CH_3)-COO(CH_2CH_2O)_{20}H$
$CH_2=C(CH_3)-COO(CH_2CH_2O)_{30}H$
$CH_2=C(CH_3)-COO(CH_2CH_2O)_{60}H$
$CH_2=C(CH_3)-COO(CH_2CH_2O)_{20}CH_3$
$CH_2=C(CH_3)-COO(CH_2CH_2O)_{30}CH_3$
$CH_2=C(CH_3)-COO(CH_2CH_2O)_{60}CH_3$
$CH_2=CH-COO[CH(CH_3)CH_2O]_{30}H$
$CH_2=CH-COO[CH(CH_3)CH_2]_{30}CH_3$
$CH_2=C(CH_3)-COO[CH(CH_3)CH_2O]_{30}H$
$CH_2=C(CH_3)-COO[CH(CH_3)CH_2O]_{30}CH_3$
$CH_2=CH-COO(CH_2CH_2O)_{30}[CH(CH_3)CH_2O]_{20}(CH_2CH_2O)_{30}H$
$CH_2=CH-COO(CH_2CH_2O)_{30}[CH(CH_3)CH_2O]_{20}(CH_2CH_2O)_{30}CH_3$
$CH_2=C(CH_3)-COO(CH_2CH_2O)_{30}[CH(CH_3)CH_2O]_{20}(CH_2CH_2O)_{30}H$
$CH_2=C(CH_3)-COO(CH_2CH_2O)_{30}[CH(CH_3)CH_2O]_{20}(CH_2CH_2O)_{30}CH_3$.

In the above-mentioned formula (3), $R^1$ represents an alkyl group, an alkenyl group, or a phenylalkyl or phenylalkenyl group each with 6–18 carbon atoms. Suitable examples of alkyl groups include hexyl, heptyl, octyl, nonyl, decyl, undecyl, dodecyl, tridecyl, tetradecyl, pentadecyl, hexadecyl, heptadecyl, and octadecyl groups. Suitable examples of alkenyl groups include hexenyl, heptenyl, octenyl, nonenyl, decenyl, undecenyl, dodecenyl, tridecenyl, tetradecenyl, pentadecenyl, hexadecenyl, heptadecenyl, and octadecenyl. Furthermore, suitable examples of phenylalkyl or phenylalkenyl groups include styryl, benzyl, etc. $R^2$ represents a hydrogen atom, an alkyl group, an alkenyl group, or a phenylalkyl or phenylalkenyl group each with 6–18 carbon atoms. Suitable examples of alkyl, alkenyl, and phenylalkyl or phenylalkenyl groups include groups similar to those given for $R^1$. "A" represents an alkylene group with 2–4 carbon atoms, and suitable examples include ethylene, propylene, butylene, isobutylene, etc. The degree of polymerization, n, is an integer of 1–200, and preferably an integer of 2–100. Suitable specific compounds of formula (3) include octyidipropenyl phenol and its 10-mole ethylene oxide addition product; octyldipropenyl phenol and its 100-mole ethylene oxide addition product; the 20-mole ethylene oxide and 10-mole propylene oxide random addition product of dodecylpropenyl phenol; and the 4-mole butylene oxide and 30-mole ethylene oxide block addition product of dodecylpropenyl phenol, etc.

In the above-mentioned formula (4), hydrocarbon groups of $R^2$ usually include alkyl, alkenyl, and alkylaryl groups each with 8–24 carbon atoms, and $R^2$ further includes acyl groups of saturated or unsaturated carboxylic acids with 8–24 carbon atoms. Specific examples of $R^2$ include octyl, nonyl, decyl, undecyl, dodecyl, tetradecyl, hexadecyl, octadecyl, oleyl, eicosyl, octylphenyl, dinonylphenyl, octanoyl, nonanoyl, decanoyl, undecanoyl, dodecanoyl, tetradecanoyl, hexadecanoyl, octadecanoyl, oleoyl, linoleoyl, eicosanoyl groups, etc. "A" represents an alkylene group with 2–4 carbon atoms, and includes ethylene, propylene, butylene, etc.; ethylene works especially well. Furthermore, L+m is preferably 20–80.

In the above-mentioned formula (5), hydrocarbon groups of $R^1$ and $R^2$ usually include alkyl groups with 1–18 carbon atoms, alkenyl groups such as oleyl, and phenyl or alkylphenyl groups, etc., with 6–30 carbon atoms, and acyl groups include acyl groups of saturated or unsaturated carboxylic acids with 2–18 carbon atoms. Suitable specific examples of hydrocarbon groups include methyl, ethyl, butyl, octyl, dodecyl, tridecyl, hexadecyl, octadecyl, phenyl, octylphenyl, nonylphenyl, dodecylphenyl, dinonylphenyl, etc. Suitable specific examples of acyl groups include acetyl, octanoyl, decanoyl, dodecanoyl, tetradecanoyl, hexadecanoyl, octadecanoyl, oleoyl, etc. $A^1$ and $A^2$ represent alkylene groups with 2–4 carbon atoms, and specifically include ethylene, propylene, and butylene groups; the ethylene group is especially preferred. A sufficient number of alkylene oxide units per molecule of a compound of formula (5) is 5–150 moles, and preferably 10–120 moles, of which 20 weight % or more of ethylene oxide units is desirable.

The aforesaid nonionic emulsifier with no radical polymerization property is preferably a polyoxyalkylene (e.g., polyoxyethylene or polyoxypropylene, and particularly polyoxyethylene) type. An ether type, ester type, ester ether type, etc., can be used as the polyoxyalkylene type; and suitable ether-type compounds include polyoxyethylene alkyl ethers (the alkyl usually being $C_{8\ or\ 9}$), polyoxyethylene alkylphenyl ethers (the alkyl usually being $C_{8\ or\ 9}$), polyoxyethylene polyoxypropylene alkyl ethers (the alkyl usually being $C_8$ or $_9$), polyoxyethylene poloxypropylene alkylphenyl ethers (the alkyl usually being $C_{8\ or\ 9}$), etc.; suitable ester-type compounds include polyoxyethylene higher fatty acid esters (mono- or diesters) (the higher fatty acid usually being a saturated or unsaturated univalent $C_{12-18}$ fatty acid), polyoxyethylene multivalent higher fatty acid esters (mono-, di-, or tri-esters) (multivalent higher fatty acids including dimeric acids of oleic acid or linoleic acid with 36 carbon atoms, trimeric acids of oleic acid or linoleic acid with 54 carbon atoms, etc.), and polyoxyethylene polycondensed oxy fatty acid esters (mono-, di-, or tri-esters) (suitable polycondensed oxy fatty acids being those with about 36–180 carbon atoms, examples including 2–10 molecules of ricinoleic acid, oxystearic acid, etc., linked together; and suitable ester ether-type compounds include polyoxyethylene sorbitan higher fatty acid esters (usually monoesters) (the higher fatty acid usually being a saturated or unsaturated univalent $C_{12-18}$ fatty acid), polyoxyethylene sorbitol higher fatty acid esters (usually monoesters) (the higher fatty acid usually being a saturated or unsaturated univalent $C_{12-18}$ fatty acid), etc.

Also usable as nonionic surfactants are higher fatty acid esters (usually monoesters) (the higher fatty acid usually being a saturated or unsaturated univalent $C_{12-18}$ fatty acid) of polyhydric alcohols such as sorbitan, sorbitol, and glycerol.

The above-mentioned emulsifier components of the present invention must not only have sufficient emulsion polymerization efficiency and satisfy the industrial productivity for the synthetic resin emulsion, but they must also have sufficient industrial operational stability without causing gelling of the treatment solution, extreme viscosity increases, etc., in the coating process with a roll coater, etc., even when the emulsion produced by emulsion polymerization with these emulsifiers contains hexavalent chromium ions and has a pH of $\leq 5$. On the other hand, the amounts of the emulsifier components relatively hydrophilic and highly likely to segregate in the coating, must be kept as small as possible, in order to fully secure various properties related to the water resistance of the coating obtained by applying and drying the chromate-containing resinous coating agent of the present invention; hence, it is desirable to adjust the mixing weight ratio of the emulsifiers to be used upon emulsion polymerization of the synthetic resin emulsion to be used in the present invention to 10:1–50, and preferably 10:2–30 as the weight ratio of the nonionic, reactive emulsifier with radical polymerization ability that contains at least one reactive carbon-carbon double bond per molecule to the nonionic emulsifier with no radical polymerization property, depending on the operating conditions, such as the coating method, speed, and temperature (atmosphere and substrate material), and the balance with required performance levels of the finished coating. Furthermore, ratios of 10:2–10 are even more preferred when the various properties related to the water resistance of the invention coating are considered very important. If the weight proportion of the nonionic emulsifier with no radical polymerization property is less than 1 as the value in the above-mentioned ratio, emulsion polymerizability becomes poor, and large emulsion particles or agglomerated blocks form easily, which sharply lowers the productivity of the synthetic resin emulsion. On the other hand, if the weight proportion of the nonionic emulsifier with no radical polymerization property exceeds 50, the nonionic emulsifier with no radical polymerization property segregates in larger quantities in the coating that consists of the chromate-containing coating agent of the present invention, and thus the various properties related to water resistance are notably worsened.

The total amount of said emulsifiers to be used upon polymerization of the synthetic resin emulsion to be used in the present invention is preferably 3–20 weight %, and more preferably 5–10 weight %, based on the resin solids content of the synthetic resin emulsion. Here, the resin solids content means (first-third monomers)+(solids content of the non-ionic reactive emulsifier)+(solids content of the nonionic non-reactive emulsifier). When the total amount of the emulsifiers is less than 3 weight %, the stability of the polymerization of the emulsion tends to become unsatisfactory, and moreover the stability of the mixture with hexavalent chromium ions at pH≦5 tends to become insufficient. With more than 20 weight %, the water resistance of the finished coating becomes extremely low, and moreover adhesion to metals and adhesion with topcoats may become unsatisfactory.

The hexavalent chromium ion to be used in the present invention is the main component in the chromate treatment, and is provided in the form of chromic acid or chromate compounds. Chromic acid can usually be provided in the form of chromic anhydride or an aqueous solution of chromic anhydride, and chromates can usually be provided in the form of salts such as ammonium, potassium, strontium, barium, sodium, or zinc salts of chromic acid or dichromic acid. The hexavalent chromium ion is a strong oxidizer, and has the effect of protecting metals from corrosion by passivating metal surfaces such as steel, zinc, and aluminum. Furthermore, some of the hexavalent chromium ions are reduced to trivalent chromium ions by the emulsifiers in an acrylic copolymer emulsion or by the functional groups in the resin under heating in the drying process at the time of film formation, and the trivalent chromium ions serve to make the hexavalent chromium ion less soluble in water and to turn the resin into a even higher polymer.

The water-based surface-treating agent for metallic materials of the present invention (hexavalent chromium ion-containing aqueous solution in the case of the two solution type) may contain trivalent chromium ions as an optional component in such a way as to replace some of the hexavalent chromium ions. In this case, trivalent chromium ions can be produced by adding a reducing agent such as methanol, ethanol, propanol, ethylene glycol, polyethylene glycol, propylene glycol, saccharose, dextrin, a starch compound, tannic acid, gallic acid, polyvinyl alcohol, ascorbic acid, formaldehyde, oxalic acid, hydrogen peroxide, pyrogallol, etc., to the aqueous solution that contains the hexavalent chromium ions, thus reducing some of the hexavalent chromium ions. Alternatively, chromium carbonate, chromium hydroxide, or chromium oxide can be dissolved in an aqueous solution of chromic acid to provide trivalent chromium ions. The hexavalent chromium ion and chromic acid offer a rust preventive effect for metals, but have the property of readily dissolving in water, and thus dissolve readily and depart from the coating when the coating comes into contact with water after said coating is made on a metal surface; as a result, not only the rust preventive effect of the coating is largely reduced, but there is also the danger that the hexavalent chromium ions will cause environmental pollution problems. The trivalent chromium ion binds to the hexavalent chromium ion (chromic acid) to form chromium chromate, which is difficult to dissolve in water and controls the leaching of hexavalent chromium from the coating, thereby contributing to the maintenance of the rust preventive effect and the prevention of environmental pollution. The trivalent chromium ion also binds to functional groups of the copolymer resin in the water-based surface-treating agent for metallic materials of the present invention, and turns the resin into an even higher polymer by crosslinking, and thus a finished coating shows properties similar to those of a thermosetting resin coating. As a result, heat resistance, workability, and various properties related to water resistance are substantially improved.

When incorporating trivalent chromium ions to replace some of the hexavalent chromium ions in anticipation of the above-mentioned effects of the trivalent chromium ion for the water-based surface-treating agent for metallic materials of the present invention, it is desirable to adjust the weight ratio of trivalent chromium ions/(trivalent chromium ions+hexavalent chromium ions) to 0.1–0.9, and preferably 0.15–0.7.

Furthermore, the water-based surface-treating agent for metallic materials of the present invention (a hexavalent chromium ion-containing aqueous solution for the two-solution type) may contain phosphate ions as an optional component, and the phosphate ions can be provided in the form of an acid such as orthophosphoric acid, alkali phosphates such as ammonium phosphate, sodium phosphate, and potassium phosphate, alkaline-earth phosphates such as calcium phosphate and magnesium phosphate, or metal phosphates such as zinc phosphate, manganese phosphate, nickel phosphate, cobalt phosphate, and aluminum phosphate.

In a simple partial reduction of the hexavalent chromium ion, the chromium reduction ($Cr^{3+}/Cr^{6+}+Cr^{3+}$) (where $Cr^{3+}$ and $Cr^{6+}$ indicate the gram-ion concentrations of the respective ions in the composition) is about 30% at most. If the reduction is advanced further, the trivalent chromium ion precipitates as chromium hydroxide. In order to increase the chromium reduction rate to more than 30% to make the chromate coating that is to be formed on a plated steel surface more insoluble in water (i.e., to increase the proportion of fixed chromium) an anion component is necessary to keep the trivalent chromium ions that are formed by reduction dissolved in solution. As the anion component for this purpose, phosphate ions with a comparatively smaller effect on various properties such as corrosion resistance are used. Furthermore, phosphate ions can be used even for the purpose of improving the appearance, since they have the effect of preventing coloring due to trivalent chromium compounds. In addition, they make easier the reduction of the hexavalent chromium ions by the emulsion resin (including the emulsifier components as well) during film formation, and can even improve the corrosion resistance, alkali resistance, etc., of a film formed on a metal by forming sparingly soluble salts with the trivalent chromium ion. What is more, even phosphonate ions can be used to replace all or some of the phosphate ions.

It is effective to add the phosphate ions to be incorporated as an optional component of the present invention especially when trivalent chromium ions are contained in the water-based surface-treating agent for metallic materials of the present invention, in which case it is suitable to incorporate the phosphate ions so as to adjust the weight ratio of ($PO_4^{3-}$)/(hexavalent chromium ion+trivalent chromium ion) to 0.05–5.0, and preferably to 0.2–4.0. If this weight ratio is less than 0.05, the effect of adding phosphate ions is insufficient; and if this weight ratio is more than 5.0, various properties related to water resistance become notably poor.

As other optional ingredients, the water-based surface-treating agent for metallic materials of the present invention may also contain the substances described below.

In the case of the two-solution type, multivalent metal ions, fluorine compounds, organic acids, inorganic dispersates, and nitrate compounds of the following optional ingredients are usually incorporated in the aqueous solution that contains hexavalent chromium ions, and lubricating additives are usually incorporated in the synthetic resin emulsion, but in some cases this can be reversed or the lubricating additives and other optional ingredients can both be added to either the aqueous solution that contains hexavalent chromium ions or the synthetic resin emulsion, depending on the specific compound. Of the other compounds, silane coupling agents and polymeric electrolytes can be placed in either one, considering the properties of the individual substances.

Other Specific Multivalent Metal Ions

At least one selected from among nickel ions, cobalt ions, manganese ions, zinc ions, zirconium ions, titanium ions, and aluminum ions.

These metal ions are believed to be effective in improving the corrosion resistance of steel sheet plated with zinc or zinc-based alloys, and are admixed in conventional aqueous compositions for chromate treatment. These metal ions are provided by nickel compounds such as nickel nitrate, nickel carbonate, nickel hydroxide, nickel phosphate, and nickel chloride; cobalt compounds such as cobalt nitrate, cobalt carbonate, cobalt hydroxide, cobalt phosphate, cobalt sulfate, and cobalt chloride; manganese compounds such as manganese nitrate, manganese carbonate, and manganese sulfate; zinc compounds such as zinc nitrate, zinc carbonate, zinc oxide, zinc phosphate, zinc sulfate, and zinc chloride; zirconium compounds; titanium compounds; and aluminum compounds, which are water-soluble or dissolve in water in the present water-based surface-treating agent for metallic materials or in the hexavalent chromium ion-containing aqueous solution in the case of the two-solution type.

Fluorine Compounds

When the water-based composition of the present invention with a pH adjusted to acidic is applied on the surface of a metallic material and then dried, a reacted chromium compound layer forms, which precipitates by displacement at the interface between the metallic material surface and the finished coating of the present invention, and this layer contributes to improving properties such as adhesion between the metallic material surface and the finished coating, the corrosion resistance at processed parts of this material, and the proportion of fixed chromium, but when the metallic material is a material plated with an aluminum-zinc alloy or aluminum, a sufficient etching reaction for the surface of the metallic material by the aqueous composition may not be expected. In such a case, the reactivity of the aqueous composition can be enhanced by adding a fluorine compound. In some cases, a fluorine compound is also added in order to enhance the corrosion-resistance effect of the hexavalent chromium ion. Examples of fluorine compounds include fluorozirconic acid, zirconium ammonium fluoride, zirconium lithium fluoride, fluorotitanic acid, titanium ammonium fluoride, titanium lithium fluoride, fluorosilicic acid, silicon ammonium fluoride, hydrofluoric acid, ammonium acid fluoride, ammonium fluoride, sodium acid fluoride, sodium fluoride, etc.

Organic Acids

Organic acids can be added in order to prevent the precipitation of metal ions such as trivalent chromium ions, nickel ions, cobalt ions, manganese ions, etc. Suitable examples of organic acids include formic acid, oxalic acid, acetic acid, hydroxyacetic acid, lactic acid, malic acid, citric acid, tartaric acid, sulfamic acid, gluconic acid, heptogluconic acid, ethylenediaminetetraacetic acid, nitrilotriacetic acid, and water-soluble salts of these acids.

Inorganic Dispersates

Inorganic dispersates can be added for purposes of the effect of the barrier that is formed by fine particles of these substances, the effect of improving the heat resistance of the coating, the effect of improving resistance to working, and moreover the effect of adsorptive slow release of the rust preventives (mainly hexavalent chromium ions) due to the adsorptive ability of these substances. Suitable examples of inorganic dispersates include finely pulverized products of inorganics that are insoluble in water, such as silica, layered silicate compounds, titanium oxide, alumina, zirconia, magnesia, etc., and these are used by means of dispersion in the water-base surface-treating agent for metallic materials of the present invention.

Nitrate Compounds

Nitrate compounds can be used for the purpose of enhancing the corrosion-resistance effect of the hexavalent chromium ions and providing blackening resistance. Suitable examples of nitrate compounds include nitric acid, ammonium nitrate, lithium nitrate, zinc nitrate, manganese nitrate, nickel nitrate, cobalt nitrate, sodium nitrate, potassium nitrate, etc.

Lubricating Additives

Lubricating additives can be added to improve the lubricity, workability, barrier effect, etc. Suitable examples of lubricating additives include polyethylene wax, polypropylene wax, fluorocarbons, polytetrafluorocarbons, polytrifluorocarbons, calcium stearate, molybdenum disulfide, etc., and they are typically used in the form of an aqueous dispersion.

Other Compounds

Silane coupling agents and polymeric electrolytes can be added to improve the proportion of fixed chromium, corrosion resistance, coatability, coating workability, etc.

The amount of each of the other above-mentioned optional ingredients to be used is not particularly critical, as long as it is the amount needed to achieve the respective objective, but as to the other specific metal ions, amounts that are too large may cause sediments in the invention surface-treating agent or in the hexavalent chromium ion-con- taining aqueous solution in the case of the two-solution type; it is therefore desirable to adjust the ratio of the total gram-ions of other specific metal ions and trivalent chromium ions to the total gram-ions of hexavalent chromium ions and phosphate as follows: (other specified metal ions+ $Cr^{3+}$)/($Cr^{6+}+PO_4^{3-}$)$\leq 0.5$. When adding lubricating agents, it is generally desirable to have the weight ratio of [the entire coating (=all solids including lubricating additives) :lubricating additives] fall in the range of 2–100.

The pH of the invention composition consisting of the above-mentioned essential components and, if necessary, optional components, i.e., the actual composition in the case of the one-solution type and the composition after mixing in the case of the two-solution type, must be 5 or less, and preferably 1–5. With a pH>5, the adhesion between an applied formed coating and a metallic material surface may not be ensured. If the pH of the invention composition is less than 1, the oxidizing power of the chromic acid is generally too strong, and difficulties are likely to arise with regard to ensuring the stability of the emulsion as well. In order to incorporate trivalent chromium ions or multivalent metal ions to be added as optional components of the present invention in a stable manner, or when consideration is given to improving the proportion of fixed chromium or the efficiency of metal crosslinking by improving the reactivity in the case of reducing excess hexavalent chromium ions with the organic components in the resin emulsion during coating formation, it is desirable to adjust the pH to 1–3.

The pH can generally be adjusted to ≦5 even by partial reduction (≦about 30%) of the chromic acid (hexavalent chromium ions), and when incorporating multivalent metal ions, the pH can also be adjusted to acidic by adding phosphoric acid, etc., to hold these ions in solution. Moreover, phosphoric acid may be used to simply adjust the pH. Also, an aqueous solution of chromic acid can be added directly. In addition, the pH can be adjusted to some extent even by organic acids, hydrofluoric acid, nitric acid, etc., of the optional components.

The method of preparation of the aqueous composition (i.e., the one-solution type) for the surface treatment of metallic materials of the present invention is not particularly critical, as long as it serves to produce a composition that contains the necessary components and as long as the specified ratios of the components used are satisfied, but it is suitable to prepare the aqueous composition in such a way as to mix a specified synthetic resin emulsion and an aqueous chromate solution that contains hexavalent chromium ions before use. The solids content of the composition to be obtained is not particularly critical, and contents of 10–50 weight % are suitable. Furthermore, it is desirable to adjust the weight ratio of the resin solids in the synthetic resin emulsion to total chromium to 10–300 as resin solids/total chromium, and preferably to 20–200, in order to balance the various properties of the coating obtained by suitably applying and drying the invention aqueous composition for practical use. Here, the resin solids means (first to third monomers)+(solids of the nonionic reactive emulsifier)+(solids of the non-ionic non-reactive emulsifier) in the present invention, as mentioned earlier.

The objects to be coated with the aqueous composition for the surface treatment of metallic materials of the present invention are, for example, metallic materials that require surface protection, such as iron, steel, zinc, aluminum, magnesium, stainless steel, tin, titanium, etc., and in particular plated steel materials prepared by plating the surface of steel materials with zinc, zinc-based alloys, aluminum-zinc alloys, aluminum, etc., which are some of the most important industrial materials.

These metallic materials may be subjected directly to coating with the invention aqueous composition, but they are usually subjected to pretreatments such as degreasing or, if necessary, a chemical conversion treatment prior to coating. These pretreatments may be performed in a manner similar to pretreatments usually performed in applying a chromate-containing resinous coating agent to the metallic material. Also, the application of the aqueous composition of the present invention on top of a coating formed by a coating-type chromate treatment as a pretreatment, can enhance the corrosion resistance even further, because a compact barrier layer of the chromate coating can be provided by the pretreatment.

Application of the invention composition to a metallic material, though not particularly restricted, can usually be achieved by spraying, dipping, roll coating methods, etc. The temperature of the invention composition being applied is not particularly restricted, but 5–40° C. is generally suitable. Drying of the coating, though not particularly restricted, can be suitably performed at 60–200° C., and usually with hot air. The thickness of the dried coating, however, will differ depending on the metallic material being used, the resin being used, the use of the final product, etc., and is generally about 0.3–5.0 g/m². Thicknesses of about 0.5–3.0 g/m² are particularly suitable.

Plated steel strip coated with zinc, a zinc-based alloy, an aluminum-zinc alloy, or aluminum is produced efficiently on a high-speed continuous plating line. A conventional chromate treatment on such a line is usually carried out by a coating process, and this coating is generally performed by bringing the invention composition into contact with the surface of the steel sheet by spraying or dipping and then removing the excess liquid by roll wiping or gas wiping. In the case of the invention composition, however, roll coating is preferred to increase the accuracy of the film thickness and also to avoid foaming of the treatment solution.

WORKING EXAMPLES AND COMPARISON EXAMPLES

The present invention will now be described in more specific terms with reference to the following working and comparison examples, however, the present invention shall not be limited by these working examples.

Production Example 1

A synthetic resin emulsion was obtained by a redox polymerization process using the following formulation:

| (A) Composition of monomer emulsion parts by weight | |
|---|---|
| Deionized water | 140 |
| EMULGEN 840S surfactant[1] | 5.6 |
| ADEKARIA soap NE-20[2] | 9.1 |
| Acrylic acid | 4 |
| 2-Methoxyethyl acrylate | 80 |
| Methyl methacrylate | 116 |
| (B) Components placed in a four-neck flask | |
| Deionized water | 110 |
| EMULGEN 840S | 2.4 |
| ADEKARIA soap NE-20 | 3.9 |
| (C) Polymerization initiator | |
| 5% Ammonium persulfate solution | 10 |
| 5% Acid sodium sulfite solution | 10 |

Note 1: 70 wt. % aqueous solution of polyoxyethylene octyl phenyl ether (nonionic emulsifier produced by Kao (Ltd.)).

Note 2: Nonionic reactive emulsifier with radical polymerization ability produced by Asahi Denka Kogyo (Ltd.) (80 wt. % aqueous solution) (corresponding to structural formula (4) of the aforesaid reactive emulsifiers.

Polymerization Method

The components of (B) are placed in a 1-L four-neck flask equipped with a stirrer, then dissolved by heating and kept at 40° C. with stirring. Separately, the components of (A) are placed in a 0.5-L Erlenmeyer flask with a stopper to prepare a monomer emulsion, then 10 weight % of this emulsion is placed in one neck of the above-mentioned four-neck flask and 25 weight % of each of 5% ammonium persulfate solution and 5% acid sodium sulfite solution are placed in another neck. The contents are then added from each neck to said four-neck flask and initial polymerization is carried out at 40–50° C. for 15–20 minutes. Subsequently, the rest of (A) (i.e., 90 weight % of the initial amount) and the rest of each of the polymerization initiators (i.e., 75 weight % of the initial amount of each) are added dropwise over 3 hours at 40–50° C. After completion of the dropwise addition, the solution is kept at 40–50° C. for 1 hour to complete the polymerization, then water is added to adjust the amount of nonvolatile matter (solids).

The emulsion thus obtained had 43% of nonvolatile matter, a viscosity of 150 mPa·s, and a pH of 2.1.

Production Examples 2–6 and Comparison Production Examples 1–3

Synthetic resin emulsions were obtained by varying the monomer composition and emulsifiers, as shown in Table 1, in Production Example 1, and carrying out the polymerization process. Here, the ratio of the emulsifiers (reactive emulsifier+emulsifier with no radical polymerization property) used in the monomer emulsion to those used in charge (B) was set as monomer emulsion:charge=7:3.

Working Examples 1–14 and Comparison Examples 1–8

Aqueous compositions for surface treating metallic materials (i.e., one solution-type water-based surface treating agents for metallic materials) that contain the synthetic resin emulsions prepared by Production Examples 1–6 and Comparison Production Examples 1–3 as given in Table 1, inorganic compounds such as hexavalent chromium ($CrO_3$ is used) or hexavalent and trivalent chromium (hexavalent chromium partially reduced by methanol), with the remainder consisting of water, and comparison aqueous compositions were each prepared as shown in Table 2. The aqueous compositions for surface treating metallic materials of the present invention and the comparison aqueous compositions had practical solution stability at all levels, as shown in Tables 3 and 4. These were applied by a roll coater to hot-dip galvanized steel sheet, hot-dip Galvannealed steel sheet, and aluminum-zinc alloy coated steel sheet (containing 55% aluminum) currently on the market, which had been degreased with an alkaline degreasing agent produced by Nihon Parkerizing (Ltd.) (trade name FINECLEANER 4336; concentration=20 g/L; degreasing agent temperature=60° C., degreasing time=10 seconds; degreasing method=spraying), followed by washing with water and drying. The coated sheets were dried for 6 seconds in hot air at 300° C. so as to adjust the attained sheet temperature to 100° C., to serve as test specimens.

The performance test results on the test specimens obtained here with the aqueous compositions for surface treating metallic materials of the present invention are shown in Table 3, and those of the test specimens with the comparison aqueous compositions are shown in Table 4.

Test Methods and Evaluation Criteria
(1) Solution Stability

To investigate the practical solution stability of the aqueous compositions and comparison aqueous compositions listed in Table 2, each solution with its temperature kept at 40° C. was continuously stirred with a conventional propeller stirrer (200 rpm) in a vessel sealed as tightly as possible, and the extent of formation of agglomerates and the appearance of gelling were evaluated by visual inspection.

Evaluation criteria:
A=no problems for 3 days or more
B=no problems for one day or more
C=large amount of agglomerates formed or there was gelling in less than one day
D=large amount of agglomerates formed or there was gelling in less than 6 hours (2) Proportion of Fixed Chromium Each test specimen prepared according to the aforesaid conditions was immersed in boiling water for 30 minutes. The amount of chromium attached to the test specimen before and after immersion was measured by an x-ray fluorescence analyzer (RIX 1000, manufactured by Rigaku Denki (Ltd.)), and the residual rate was calculated. The higher the residual rate (fixed rate), the better the result.

Proportion of fixed chromium $(\%)=(b/a)\times100$;

a=amount of chromium attached before immersion (mg/m$^2$)
b=amount of chromium attached after immersion (mg/m$^2$)

Evaluation criteria:
A=proportion of fixed chromium≧90%
B=70% proportion of fixed chromium<90%
C=50% proportion of fixed chromium<70%
D=proportion of fixed chromium<50%

(3) Coating Appearance

The coloring degree (yellowness) of each test specimen prepared at the aforesaid condition was measured according to JIS Z 8722 with the use of a colorimeter (CR-300, manufactured by Minolta Camera (Ltd.)). Lower coloring degrees (YI values) are more desirable.

Evaluation criteria:
A=YI value<0
B=0≦YI value<1
C=1≦YI value<3
D=YI value<3

(4) Corrosion Resistance of Flat Parts

Each test specimen prepared according to the aforesaid conditions was subjected to an accelerated corrosion test in a salt spray testing machine conforming to JIS Z 2371 for 240 hours, then the percentage of the area covered with corrosion products (rust) was evaluated by visual inspection. The smaller the rusted area percentage, the better the corrosion resistance.

Evaluation criteria:
A=rusted area percentage<10%
B=10%≦rusted area percentage<30%
C=30%≦rusted area percentage<50%
D=rusted area percentage≧2 50%

(5) Corrosion Resistance of Worked Parts

Each test specimen prepared according to the aforesaid conditions was subjected to 5-mm Erichsen extrusion, and then to an accelerated corrosion test in a salt spray testing machine conforming to JIS Z 2371 for 120 hours, and the percentage of the area covered with corrosion products (rust) in the worked part was evaluated by visual inspection. The smaller the rusted area percentage, the better the corrosion resistance.

Evaluation criteria:
A=rusted area percentage<10%
B=10%≦rusted area percentage<30%
C=30%≦rusted area percentage<50%
D=rusted area percentage≧50%

(6) Moisture Resistance

Each test specimen prepared according to the aforesaid conditions was subjected to a moisture resistance test in a constant-humidity and constant-temperature environment (temperature 70° C., humidity 98%) for 3 days, and the extent of formation of corrosion products (powdery white rust, black rust=blackening) was evaluated by visual inspection. The smaller the extent of formation of corrosion products, the better the moisture resistance (or blackening resistance).

Evaluation criteria:

A=no corrosion products seen

B=light degree of corrosion products seen in various portions

C=light degree of corrosion products seen over almost the entire surface

D=notable corrosion products seen over almost the entire surface (7) Acid Resistance Each test specimen prepared according to the aforesaid conditions was immersed in a 1 wt. % aqueous solution of sulfuric acid for 60 minutes, then washed with water and dried. Acid resistance was evaluated by visually in-specting the extent of change in the appearance of the coating and the extent of discoloration (corrosion) of the metal surface.

Evaluation criteria:

A=no change in coating appearance and no discoloration of metal surface seen

B=slight coating detachment (including dissolution) in part or discoloration of metal surface seen C=partial coating detachment (including dissolution) spreading over almost the entire surface or notable discoloration of metal surface seen D=practically no remaining coating due to detachment or dissolution of the coating, and discoloration of the metal surface was notable as well (8) Alkali Resistance Each test specimen prepared according to the aforesaid conditions was immersed in a 1 wt. % aqueous solution of sodium hydroxide for 60 minutes, then washed with water and dried. Alkali resistance was evaluated by visually inspecting the extent of change in the appearance of the coating and the extent of discoloration (corrosion) of the metal surface.

Evaluation criteria:

A=no change in coating appearance and no discoloration of metal surface seen

B=slight coating detachment (including dissolution) in part or discoloration of metal surface seen C=partial coating detachment (including dissolution) spreading over almost the entire surface or notable discoloration of metal surface seen D=practically no remaining coating due to detachment or dissolution of the coating, and discoloration of the metal surface was notable as well (9) Primary Adhesion of Topcoat Each test specimen prepared under the aforesaid conditions was coated with a melamine alkyd paint (DELICON #700 produced by Dainippon Toryo (Ltd.)) to give a coating thickness of 25±5 µm, and then subjected to bake drying at 140° C. for 20 minutes to provide a coated test specimen. 100 1-mm squares were cut into these coated test specimens down to the substrate with the use of a cutter, then this crosscut area was extruded 5 mm with an Erichsen testing machine and covered with cellotape, which was then peeled off. Primary adhesion of the topcoat was evaluated by the number of squares with remaining coating after the cellotape was peeled off. The larger the number of squares with remaining coating, the better the adhesion.

Evaluation criteria:

A=number of squares with remaining coating≧95

B=70≦number of squares with remaining coating<95

C=50≦number of squares with remaining coating<70

D=number of squares with remaining coating<50

(10) Secondary Adhesion of Topcoat

Each test specimen prepared according to the aforesaid conditions was coated with a melamine alkyd paint (DELICON #700 produced by Dainippon Toryo (Ltd.)) to give a coating thickness of 25±5 µm, and then subjected to bake drying at 140° C. for 20 minutes to provide a coated test specimen. These coated test specimens were immersed in boiling water for 2 hours, and then subjected to the crosscut Erichsen test in the same way as with the aforementioned primary adhesion test. The evaluation criteria here are the same as in (9).

For Working Examples 1–14 using the aqueous compositions for surface treating metallic materials of the present invention, all the test specimens gave excellent results with regard to the proportion of fixed chromium, coating appearance, corrosion resistance (flat parts and worked parts), moisture resistance (including blackening resistance), acid resistance, alkali resistance, and topcoat adhesion (primary and secondary). For Comparison Examples 1–8 using aqueous compositions outside the scope of the present invention, on the other hand, some of the test results for these properties were inferior. In more detail, Comparison Examples 1, 2, and 5 gave particularly inferior test results with regard to some of the properties (corrosion resistance, moisture resistance, acid resistance, alkali resistance, secondary adhesion of the topcoat) related to water resistance, since the synthetic resin emulsion used in emulsion polymerization was produced with just a nonionic emulsifier with no radical polymerization property. Comparison Examples 3, 4, and 6 gave inferior test results in topcoat adhesion (primary and secondary), since the second monomer component as an ingredient of the synthetic resin emulsion used was not copolymerized and adhesion to the substrate metal and topcoat was insufficient. Comparison Examples 7 and 8 gave particularly inferior test results with regard to some of the properties related to water resistance, since the synthetic resin emulsions used in emulsion polymerization were produced with just a nonionic emulsifier with no radical polymerization property, and in addition they gave inferior test results with regard to the proportion of fixed chromium, coating appearance (Comparison Example 7), and topcoat adhesion (primary and secondary), since the pH of the aqueous composition was outside the scope of the present invention.

INDUSTRIAL APPLICABILITY

The aqueous compositions for surface treating metallic materials of the present invention characterized by comprising synthetic resin emulsions and hexavalent chromium ions, and by having a pH of 5 or lower, the synthetic resin emulsions being prepared by emulsion polymerization with the use of a reactive emulsifier with radical polymerization ability, which is nonionic and has at least one reactive carbon-carbon double bond per molecule, and a nonionic emulsifier with no radical polymerization property as emulsifiers upon emulsion production in specified monomer compositions, were developed, and thereby various requirements related to the water resistance of a finished coating, i.e., a wide variety of properties such as corrosion resistance, blackening resistance, wet secondary adhesion to topcoats, low-pollution characteristics (proportion of fixed chromium), chemical resistance (especially acid resistance and alkali resistance), etc., can now be satisfied to a greater extent without impairing the practical solution stability of the conventional chromate-containing resinous coating agents. Accordingly, they are extremely valuable in practical use.

TABLE 1

COMPOSITIONS OF PRODUCTION EXAMPLES

| INGREDIENT OR OTHER CHARACTERISTIC | Working Number: 1 | 2 | 3 | 4 | 5 | 6 | Comparison Number: 1 | 2 | 3 |
|---|---|---|---|---|---|---|---|---|---|
| Methacrylic acid | | | 4 | | | | | | |
| Acrylic acid | 4 | 4 | | 4 | 4 | 4 | 4 | 4 | 4 |
| N-Methylol acrylamide | | 3 | | | 3 | | 3 | 3 | |
| 2-Methoxyethyl acrylate | 80 | | | 80 | | 80 | | | |
| Phosphonyloxyethyl acrylate | | | 4 | | | | | | |
| n-Butyl acrylate | | 77 | 76 | | 77 | | 77 | 77 | 77 |
| Methyl methacrylate | 116 | 116 | 56 | 116 | 116 | 116 | 116 | 116 | 116 |
| Styrene | | | 60 | | | | | | |
| ADEKARIA soap NE-20 | 13 | 13 | 13 | | 3.5 | 23 | | | 13 |
| AKULON RS-20* | | | | 10 | | | | 21 | |
| EMULGEN 840S | 8 | 8 | 8 | 8 | 11.5 | 53 | 21 | | 8 |
| Weight % of resin solids | 43 | 43 | 43 | 43 | 43 | 43 | 43 | gelling | 43 |
| Viscosity, mPa · sec | 150 | 210 | 300 | 120 | 110 | 250 | 750 | | 130 |
| pH | 2.1 | 2.2 | 1.8 | 2.0 | 2.1 | 2.1 | 2.2 | | 2.0 |
| | | | | | | | | Solids 100% | |

*Produced by Daiichi Kogyo Seiyaku (Ltd.); nonionic radical polymerizing reactive emulsifier (corresponding to structural formula (3) of the aforesaid reactive emulsifier).

TABLE 2

| | | | | Working Treatment Composition Examples | | | | | | | | | | | |
|---|---|---|---|---|---|---|---|---|---|---|---|---|---|---|---|
| | | | | 1 | 2 | 3 | 4 | 5 | 6 | 7 | 8 | 9 | 10 | 11 | 12 |
| Weight % in Aqueous Compositions for Surface Treating Metals | Inorganics | $Cr.^{-6}$ | | 2.0 | 1.0 | 0.5 | 0.1 | 0.1 | 0.4 | 0.2 | 0.4 | 0.8 | 0.2 | 0.8 | 0.8 |
| | | $Cr.^{-3}$ | | 1.0 | 0.2 | 0.1 | 0.1 | | 0.2 | 0.4 | 0.2 | 0.4 | | 0.4 | 0.4 |
| | | $PO_4^{-3}$ | | 1.0 | | | 0.4 | | 0.5 | 2.4 | 1.2 | 0.5 | | 1.2 | 0.7 |
| | | $H_2ZrF_6$ | | | | | | | 0.2 | | | | | | |
| | | Silica* | | | | | | | | | | | 0.5 | | |
| | | $NO_3^-$ | | | | | | | | | | 0.2 | | | |
| | | Other Metal Ions | | | | | | | | | $0.1^1$ | $0.1^2$ | | | $0.3^3$ |
| | | $NH_3$ | | | | | | | | | | | | | |
| | Organics | Polyethylene wax** | | | | | | | | | | | | 1.3 | 7.5 |
| | | Composition of Production Example Number: | 1 | 70 | | | | | | 70 | | | | | |
| | | | 2 | | 70 | | | | | | 70 | | | | |
| | | | 3 | | | 70 | | | | | | 70 | | | |
| | | | 4 | | | | 70 | | | | | | 70 | | |
| | | | 5 | | | | | 70 | | | | | | 70 | |
| | | | 6 | | | | | | 70 | | | | | | |
| | | Composition of Production Comparison Example Number: | 1 | | | | | | | | | | | | |
| | | | 2 | | | | No use possible because of gelling | | | | | | | | |
| | | | 3 | | | | | | | | | | | | |
| pH | | | | 1.6 | 1.4 | 1.5 | 1.7 | 1.6 | 2.0 | 1.5 | 2.3 | 1.9 | 1.5 | 1.6 | 3.4 |
| Ratio of Resin Solids to Total Chromium | | | | 10 | 25 | 50 | 150 | 300 | 50 | 50 | 50 | 25 | 150 | 25 | 25 |
| Ratio of $Cr^{+3}$ to Total of $Cr^{+6}$ and $Cr.^{-3}$ | | | | 0.3 | 0.2 | 0.2 | 0.5 | | 0.3 | 0.7 | 0.3 | 0.3 | | 0.3 | 0.3 |
| Ratio of $PO_4^{-3}$ to Total of $Cr.^{+6}$ and $Cr.^{+3}$ | | | | 0.3 | | | 2.0 | | 0.8 | 4.0 | 2.0 | 0.4 | | 1.0 | 0.6 |

| | | | | Comparison Treatment Composition Examples | | | | | |
|---|---|---|---|---|---|---|---|---|---|
| | | | | 1 | 2 | 3 | 4 | 5 | 6 |
| Weight % in Aqueous Compositions for Surface Treating Metals | Inorganics | $Cr.^{-6}$ | | 0.8 | 0.8 | 0.2 | 0.1 | 0.6 | 0.2 |
| | | $Cr.^{-3}$ | | 0.4 | 0.4 | | 0.1 | | |
| | | $PO_4^{-3}$ | | 1.2 | 2.4 | | 0.4 | | |
| | | $H_2ZrF_6$ | | | | | | | |
| | | Silica* | | | | | | | |
| | | $NO_3^-$ | | | | | | | |
| | | Other Metal Ions | | | | | | | |
| | | $NH_3$ | | | | | | 0.4 | 0.2 |
| | Organics | Polyethylene wax** | | | | | | | |
| | | Composition of Production Example Number: | 1 | | | | | | |
| | | | 2 | | | | | | |
| | | | 3 | | | | | | |
| | | | 4 | | | | | | |
| | | | 5 | | | | | | |
| | | | 6 | | | | | | |
| | | Composition of Production | 1 | 70 | | 70 | | 70 | 70 |
| | | | 2 | | No use possible because of gelling | | | | |

TABLE 2-continued

|  | Comparison | 3 | 70 | 70 |  |  |  |
|---|---|---|---|---|---|---|---|
| pH |  | 1.4 | 1.4 | 1.5 | 1.7 | 6.6 | 7.1 |
| Ratio of Resin Solids to Total Chromium |  | 25 | 25 | 150 | 150 | 50 | 150 |
| Ratio of $Cr^{+3}$ to Total of $Cr^{+6}$ and $Cr.^{-3}$ |  | 0.3 | 0.3 |  | 0.5 |  |  |
| Ratio of $PO_4^{-3}$ to Total of $Cr.^{+6}$ and $Cr.^{+3}$ |  | 1.0 | 2.0 |  | 2.0 |  |  |

*SNOW TEX O colloidal silica dispersion (solids content = 20%), produced by Nissan Petrochemicals Ltd.

**Wax emulsion with an average particle size of 3 μm (solids content = 40%).

[1] $Ni^{-2}$

[2] $Zn^{-2}$

[3] $Co^{+2}$*

TABLE 3

|  |  | Working Example Number: | | | | | | | | | | | | | |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 |
| Aqueous Composition Number: |  | 1 | 2 | 2 | 3 | 4 | 5 | 6 | 7 | 7 | 8 | 9 | 10 | 11 | 12 |
| Metal Sheet Treated | Hot-dip galvanized steel sheet | ○ | ○ |  |  |  |  | ○ | ○ |  | ○ | ○ |  | ○ | ○ |
|  | Hot-dip Galvanneal steel sheet |  |  | ○ | ○ |  |  |  |  | ○ |  |  | ○ |  |  |
|  | Aluminum-zinc alloy coated steel sheet |  |  |  |  | ○ | ○ |  |  |  |  |  |  |  |  |
| Resin solids deposited, g/m² |  | 0.5 | 0.5 | 0.5 | 1.0 | 1.5 | 3.0 | 2.0 | 1.5 | 2.5 | 1.5 | 1.0 | 3.0 | 1.0 | 1.5 |
| Chromium deposited, mg/m² |  | 50 | 20 | 20 | 20 | 10 | 10 | 40 | 30 | 50 | 30 | 40 | 15 | 40 | 60 |
| Aqueous Composition Stability |  | B |  | B | A | A | B | A |  | B | A | B | B | B | B |
| Coating Properties | Proportion of Fixed Chromium | A | A | A | A | A | B | A | A | A | A | A | B | A | A |
|  | Coating Appearance | A | B | B | B | A | B | A | A | A | A | A | B | A | A |
|  | Corrosion Resistance of Flat Parts | A | A | B | A | A | B | A | A | A | A | A | A | A | A |
|  | Corrosion Resistance of Worked Parts | B | B | B | B | B | B | A | B | B | B | A | B | A | A |
|  | Moisture Resistance | B | B | B | A | A | B | A | B | B | B | A | B | B | A |
|  | Acid Resistance | B | B | B | A | A | B | A | B | A | A | A | B | A | A |
|  | Alkali Resistance | B | B | B | A | B | B | A | B | B | B | A | B | B | B |
|  | Primary Adhesion of Topcoat | A | A | A | A | A | A | A | A | A | A | A | A | A | B |
|  | Secondary Adhesion of Topcoat | A | A | A | A | A | B | A | A | A | A | A | B | A | B |

TABLE 4

|  |  | Comparison Example Number: | | | | | | | |
|---|---|---|---|---|---|---|---|---|---|
|  |  | 1 | 2 | 3 | 4 | 5 | 6 | 7 | 8 |
| Comparison Aqueous Composition Number: |  | 1 | 1 | 2 | 2 | 3 | 4 | 5 | 6 |
| Metal Sheet Treated | Hot-dip galvanized steel sheet | ○ |  | ○ |  |  | ○ |  |  |
|  | Hot-dip Galvanneal steel sheet |  | ○ |  | ○ |  | ○ | ○ | ○ |
|  | Aluminum-zinc alloy coated steel sheet |  |  |  |  | ○ |  |  |  |
| Resin solids deposited, g/m² |  | 0.5 | 1.0 | 1.0 | 0.5 | 1.5 | 3.0 | 1.0 | 1.5 |
| Chromium deposited, mg/m² |  | 20 | 40 | 40 | 20 | 20 | 10 | 20 | 10 |
| Aqueous Composition Stability |  |  | B |  | B | B | A | A | A |
| Coating Properties | Proportion of Fixed Chromium | A | A | A | A | B | A | D | D |
|  | Coating Appearance | A | A | A | A | A | A | D | B |
|  | Corrosion Resistance of Flat Parts | A | A | A | A | C | A | C | B |
|  | Corrosion Resistance of Worked Parts | C | B | B | B | D | B | D | D |
|  | Moisture Resistance | D | C | A | A | D | A | D | C |
|  | Acid Resistance | C | B | A | B | C | A | C | C |
|  | Alkali Resistance | D | C | A | B | D | A | D | D |
|  | Primary Adhesion of Topcoat | B | A | C | C | B | C | C | C |
|  | Secondary Adhesion of Topcoat | D | C | D | D | C | D | D | D |

What is claimed is:

1. A water-based surface-treating agent for metallic materials that has a pH of 5 or less and comprises water and a synthetic resin emulsion obtained by emulsion polymerizing the following ingredients:

(1) a first monomer component consisting of one or more ethenic unsaturated carboxylic acids;

(2) a second monomer component consisting of functional acrylic monomers that contain at least one of N-(unsubstituted or methylol substituted)carbamoyl, phosphonate, alkoxy, cyano, and carbamoyl groups; and (3) a third monomer component that is not included in components (1) or (2), is copolymerizable with the monomers of components (1) and (2), and forms the skeleton of the copolymer to be obtained, the emulsifier for emulsion polymerizing comprising:

a reactive emulsifier that:
 is nonionic;
 has at least one reactive carbon-carbon double bond per molecule; and
 has radical polymerization ability; and a nonionic emulsifier with no radical polymerization property.

2. A water-based surface-treating agent for metallic materials as claimed in claim 1, in which the weight ratio of the reactive emulsifier with radical polymerization ability to the nonionic emulsifier with no radical polymerization property is from 10:1 to 10:50.

3. A water-based surface-treating agent for metallic surfaces as claimed in claim 2, in which the proportions of the monomer components from the first to the third are 0.5–10 weight % for the first monomer component, 0.5–60 weight % for the second monomer component, and 30–99 weight % for the third monomer component, based on the total of the three monomer components.

4. A water-based surface-treating agent for metallic materials as claimed in claim 3, in which the third monomer component is one or more monomers selected from the group consisting of (meth)acrylic acid esters not included in component (2), styrene, methylstyrene, vinyl acetate, vinyl esters of saturated carboxylic acids branched at the α-position, vinyl chloride, vinyl toluene, and ethylene.

5. A water-based surface-treating agent for metallic materials as claimed in claim 1, additionally comprising hexavalent chromium ions.

6. A water-based surface-treating agent for metallic materials as claimed in claim 5, in which the weight ratio of the reactive emulsifier with radical polymerization ability to the nonionic emulsifier with no radical polymerization property is from 10:1 to 10:50.

7. A water-based surface-treating agent for metallic surfaces as claimed in claim 6, in which the proportions of the monomer components from the first to the third are 0.5–10 weight % for the first monomer component, 0.5–60 weight % for the second monomer component, and 30–99 weight % for the third monomer component, based on the total of the three monomer components.

8. A water-based surface-treating agent for metallic materials as claimed in claim 7, additionally comprising trivalent chromium ions, the weight ratio of trivalent chromium ions/(hexavalent chromium ions+trivalent chromium ions) being from 0.1–0.9.

9. A water-based surface-treating agent for metallic materials as claimed in claim 8, additionally comprising phosphate ions, the weight ratio of phosphate ions ($PO_4^{3-}$)/(hexavalent chromium ions+trivalent chromium ions) being from 0.05–5.0.

10. A water-based surface-treating agent for metallic materials as claimed in claim 9, in which the third monomer component is one or more monomers selected from the group consisting of (meth)acrylic acid esters not included in component (2), styrene, methylstyrene, vinyl acetate, vinyl esters of saturated carboxylic acids branched at the α-position, vinyl chloride, vinyl toluene, and ethylene.

11. A water-based surface-treating agent for metallic surfaces as claimed in claim 1, in which the proportions of the monomer components from the first to the third are 0.5–10 weight % for the first monomer component, 0.5–60 weights for the second monomer component, and 30–99 weight % for the third monomer component, based on the total of the three monomer components.

12. A water-based surface-treating agent for metallic materials as claimed in claim 11, additionally comprising trivalent chromium ions, the weight ratio of trivalent chromium ions/(hexavalent chromium ions+trivalent chromium ions) being from 0.1–0.9.

13. A water-based surface-treating agent for metallic materials as claimed in claim 12, additionally comprising phosphate ions, the weight ratio of phosphate ions ($PO_4^{3-}$)/(hexavalent chromium ions+trivalent chromium ions) being from 0.05–5.0.

14. A water-based surface-treating agent for metallic materials as claimed in claim 13, in which the third monomer component is one or more monomers selected from the group consisting of (meth)acrylic acid esters not included in component (2), styrene, methylstyrene, vinyl acetate, vinyl esters of saturated carboxylic acids branched at the α-position, vinyl chloride, vinyl toluene, and ethylene.

15. A water-based surface-treating agent for metallic materials as claimed in claim 1, in which the third monomer component is one or more monomers selected from the group consisting of (meth)acrylic acid esters not included in component (2), styrene, methylstyrene, vinyl acetate, vinyl esters of saturated carboxylic acids branched at the α-position, vinyl chloride, vinyl toluene, and ethylene.

16. A process for forming a protective coating on a surface of a metal substrate, said process comprising forming over said surface a liquid coating of a water-based treating agent according to claim 5 and drying said liquid coating into place on said surface to form said protective coating.

17. A process as claimed in claims 16, in which, in the water-based treating agent, the weight ratio of the reactive emulsifier with radical polymerization ability to the nonionic emulsifier with no radical polymerization property is from 10:1 to 10:50.

18. A process as claimed in claim 16, in which, in the water-based treating agent, the proportions of the monomer components from the first to the third are 0.5–10 weight % for the first monomer component, 0.5–60 weight % for the second monomer component, and 30–99 weight % for the third monomer component, based on the total of the three monomer components.

19. A process as claimed in claim 16, in which the water-based treating agent additionally comprises trivalent chromium ions, the weight ratio of trivalent chromium ions/(hexavalent chromium ions+trivalent chromium ions) being from 0.1–0.9.

20. A process according to claim 16, wherein:
 the water-based surface-treating agent additionally comprises hexavalent chromium ions;
 in the water-based surface-treating agent, the weight ratio of the reactive emulsifier with radical polymerization ability to the nonionic emulsifier with no radical polymerization property is from 10:1 to 10:50;

in the water-based surface-treating agent, the proportions of the monomer components from the first to the third are 0.5–10 weight % for the first monomer, 0.5–60 weight % for the second monomer, and 30–99 weight % for the third monomer, based on the total of the three monomers;

the water-based surface-treating agent additionally comprises trivalent chromium ions, the weight ratio of trivalent chromium ions/(hexavalent chromium ions+trivalent chromium ions) being from 0.1–0.9;

the water-based surface-treating agent, additionally comprises phosphate ions, the weight ratio of phosphate ions ($PO_4^{3-}$)/(hexavalent chromium ions+trivalent chromium ions) being from 0.05–5.0;

in the water-based surface-treating agent, the third monomer component is one or more monomers selected from the group consisting of (meth)acrylic acid esters not included in component (2), styrene, methylstyrene, vinyl acetate, vinyl esters of saturated carboxylic acids branched at the α-position, vinyl chloride, vinyl toluene, and ethylene.

* * * * *

UNITED STATES PATENT AND TRADEMARK OFFICE
CERTIFICATE OF CORRECTION

PATENT NO.     : 6,447,620 B1
DATED          : September 10, 2002
INVENTOR(S)    : Komiyama et al.

It is certified that error appears in the above-identified patent and that said Letters Patent is hereby corrected as shown below:

Column 26,
Line 14, delete "weights"; and insert therefor -- weight % -- .
Line 46, delete "claims"; and insert therefor -- claim --.

Signed and Sealed this

Sixth Day of May, 2003

JAMES E. ROGAN
*Director of the United States Patent and Trademark Office*